(12) United States Patent
Yun et al.

(10) Patent No.: US 11,860,769 B1
(45) Date of Patent: Jan. 2, 2024

(54) AUTOMATIC TEST MAINTENANCE LEVERAGING MACHINE LEARNING ALGORITHMS

(71) Applicant: Amazon Technologies, Inc., Seattle, WA (US)

(72) Inventors: Sunghee Yun, Richmond (CA); Benjamin John Frederickson, Vancouver (CA); Adam Bowron, Vancouver (CA); Pierre Galin, Mercer Island, WA (US); Suhail Mirza, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 16/703,571

(22) Filed: Dec. 4, 2019

(51) Int. Cl.
*G06F 11/36* (2006.01)
*G06N 20/00* (2019.01)

(52) U.S. Cl.
CPC ...... *G06F 11/3688* (2013.01); *G06F 11/3664* (2013.01); *G06F 11/3684* (2013.01); *G06N 20/00* (2019.01)

(58) Field of Classification Search
CPC ............ G06F 11/3688; G06F 11/3684; G06F 11/3692; G06F 11/3664; G06N 20/00
USPC ........................................................ 717/124
See application file for complete search history.

(56) References Cited

U.S. PATENT DOCUMENTS

| | | | | |
|---|---|---|---|---|
| 8,117,591 | B1* | 2/2012 | Michelsen | G06F 3/0482 717/109 |
| 8,826,084 | B1* | 9/2014 | Gauf | G06F 11/3688 714/46 |
| 8,924,938 | B2* | 12/2014 | Chang | G06F 11/3688 717/128 |
| 10,963,313 | B2* | 3/2021 | Nag | G06N 20/00 |
| 11,100,406 | B2* | 8/2021 | Hu | G06N 20/00 |
| 2006/0075306 | A1* | 4/2006 | Chandrasekaran | G06F 11/3688 714/47.2 |
| 2008/0082968 | A1* | 4/2008 | Chang | G06F 11/3688 717/128 |
| 2018/0052898 | A1* | 2/2018 | Allan | G06F 16/254 |
| 2018/0210815 | A1* | 7/2018 | Chau | G06F 8/433 |
| 2018/0322036 | A1* | 11/2018 | Alam | G06F 11/3688 |

(Continued)

OTHER PUBLICATIONS

"A Beginner's Guide to Deep Reinforcement Learning", Skymind, Retrieved from https://skymind.ai/wiki/deep-reinforcement-learning on Nov. 27, 2019, pp. 1-13.

(Continued)

*Primary Examiner* — Jason D Mitchell
(74) *Attorney, Agent, or Firm* — Robert C. Kowert; Kowert, Hood, Munyon, Rankin & Goetzel, P.C.

(57) ABSTRACT

A test execution and maintenance system may include an application learner configured to develop knowledge of operations of an application based on one or more learning test. The test execution and maintenance system then may include a test execution and repair manager configured to execute a functional test of the application, detect a failure of the functional test, and repair the functional test based on the knowledge of operations of the application. Responsive to detecting the failure of the functional test, the application (Continued)

learner may optionally perform a re-learning process and update the previously acquired knowledge of operations of the application.

15 Claims, 12 Drawing Sheets

(56) References Cited

U.S. PATENT DOCUMENTS

| | | | | |
|---|---|---|---|---|
| 2019/0245754 A1* | 8/2019 | Greene, Jr. | ............ | G06N 3/084 |
| 2019/0258953 A1* | 8/2019 | Lang | .................... | G06N 3/0454 |
| 2019/0286546 A1* | 9/2019 | Johnston | ............... | G06F 11/006 |
| 2019/0317734 A1* | 10/2019 | Chen | ................... | G06N 3/0454 |
| 2019/0384699 A1* | 12/2019 | Arbon | .................... | G06N 20/00 |
| 2020/0065670 A1* | 2/2020 | Nag | ....................... | G06N 20/00 |
| 2020/0074331 A1* | 3/2020 | Arendt | ................... | G06N 20/00 |
| 2020/0076857 A1* | 3/2020 | Van Seijen | ............ | G06N 20/00 |
| 2020/0159315 A1* | 5/2020 | Myers | ................. | G06F 11/3438 |
| 2020/0167271 A1* | 5/2020 | Zhang | .................... | G06N 5/022 |
| 2020/0371755 A1* | 11/2020 | Patni | ........................ | G06F 8/34 |
| 2021/0019250 A1* | 1/2021 | Feng | .................. | G06F 11/3636 |
| 2021/0064515 A1* | 3/2021 | Xu | ...................... | G06F 11/3684 |

OTHER PUBLICATIONS

Yuanchun Li, et al., "DroidBot: A Lightweight UI-Guided Test Input Generator for Android", 2017 IEEE/ACM 39th IEEE International Conference on Software Engineering Companion, 2017, pp. 23-26.
Wikipedia, "Markov decision process", Retrieved from https://en.wikipedia.org/wiki/Markov_decision_process on Nov. 27, 2019, pp. 1-11.
Ke Mao, et al, "Sapienz: Multi-objective Automated Testing for Android Applications", ACM, Proceedings of the 25th International Symposium on Software Testing and Analysis, 2016, pp. 94-105.
Geeksforgeeks, "Reinforcement Learning", Retrieved from https://www.geeksforgeeks.org/what-is-reinforcement-earning/ on Nov. 27, 2019, pp. 1-5.
Wikipedia, "Reinforcement learning", Retrieved from https://en.wikipedia.org/wiki/Reinforcement_learning#:~:targetText=Reinforcement learning (RL) is an, supervised learning and unsupervised learning on Nov. 27, 2019, pp. 1-11.
Wikipedia, "Transfer learning", Retrieved from https://en.wikipedia.org/wiki/Transfer_learning on Nov. 27, 2019, pp. 1-3.

* cited by examiner

AUTOMATIC TEST MAINTENANCE LEVERAGING MACHINE LEARNING ALGORITHMS

BACKGROUND

Software testing aims at validating functionalities of computer software, for example, mobile applications, often on various operating systems and in a plurality of versions. Automated testing reduces costs and increases efficiency than manual testing. However, existing automated testing tools typically employ techniques such as random testing or fuzz testing where an application is tested with random inputs. The testing can be time-consuming but still without guarantee that the randomly selected tasks and data cover all the valid operating conditions. A test may include one or more cases each with a set of test steps. When one test case or step breaks because of failures, the entire test can abort, and a tester such as a quality assurance engineer (QAE) has to manually repair the test. That is against the exact purpose of "automation." Even if the test can complete, the randomness of the testing often makes the defects found difficult or impossible to reproduce, or detects only issues with high crash rates. As today's software become complicated with increased functionalities, are distributed to a wider variety of devices, and transition to agile with more frequent updates, automated testing becomes a more challenging task. It thus becomes desirable for a more intelligent tool for automatic test maintenance.

Figure 1:
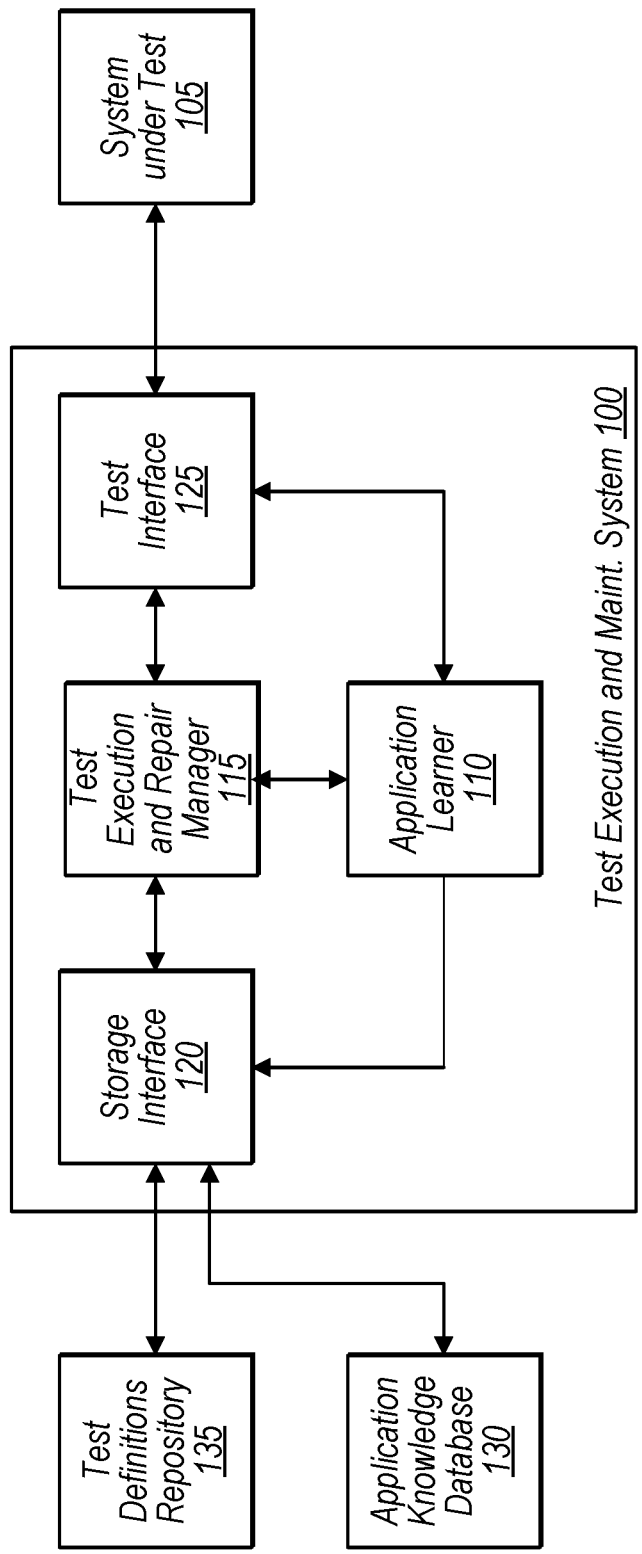
FIG. 1 is a block diagram showing an example test execution and maintenance system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

In various embodiments, an application test execution and maintenance system may be implemented. The test execution and maintenance system may include an application learner and a test execution and repair manager. The application learner may be trained, based on one or more learning tests, to develop knowledge as to operations of an application. In training, the application learner may execute learning tests with explorations to navigate operations of the application. For instance, if a given learning test may be viewed as a sequence of operations of the application (hereinafter "path"), the application leaner may deviate from a path prescribed by the given learning test to explore one or more alternative sequences of operations to complete the learning test. The explorations allow the application leaner to acquire knowledge of operations of the application. Once trained, the test execution and maintenance system may be deployed to execute and maintain a functional test of the application. For instance, the test execution and maintenance system may use the test execution and repair manager to execute the application, following a functional test definition. The test execution and repair manager may detect a failure in the functional test. Responsive to detecting the failure, the test execution and repair manager may repair the functional test based on the acquired knowledge of operations of the application. In particular, the test execution and repair manager may determine a repair, for instance, by identifying an alternative sequence of operations to circumvent the failure. The test execution and repair manager may then apply the repair to patch the functional test. The automatic repair of a broken test can avoid undesired interruptions and improve efficiency of automatic testing. According to some embodiments, responsive to detecting a failure, the test execution and maintenance system may optionally command the application learner to perform a re-learning process. The re-learning may update the knowledge of the application, especially to reflect constraints to operations of the application. For instance, a failure may break one or more sequences of operations, and a previously identified path may not be a viable alternative path any more. Thus, the test execution and maintenance system need to update its knowledge base in order to perform repairs appropriately. According to some embodiments, the application learner may leverage a transfer training for re-learning. For instance, instead of start from scratch, the application learner may re-learn with parameters developed from prior training. The transfer learning may save time and improve efficiency of the application learner. According to some embodiments, the application learner may be implemented based on reinforcement learning. The reinforcement learning may train the application leaner with rewards. Compared with existing techniques with random input, the reinforcement learning can provide a more directional learning experience to the test execution and maintenance system. In some embodiments, the application learner may also implement an asynchronous learning to develop knowledge of operations of multiple applications. This provides the test execution and maintenance system abilities to test and maintain multiple applications.

FIG. 1 shows an example test execution and maintenance system, according to some embodiments. As shown in FIG. 1, test execution and maintenance system 100 may include application learner 110 and test execution and repair manager 115. Application learner 110 may receive a learning test definition, for instance, from test definitions repository 135 through storage interface 120. Test definitions repository 135 may store one or more testing definitions for an application, for instance, a mobile shopping application. One test definition may provide one or more cases each with a set of test steps of the application. In other words, a test definition may prescribe one or more sequences of operations of the application. The learning test definition may be same as a functional test definition that prescribes a functional test to be tested by execution and repair manager 115. Alternatively, the learning test definition may prescribe a different sequence of operations from the functional test definition. The purpose of the learning test definition is to provide a starting point for application learner to run and explore operations of the application. For example, the learning test may prescribe the sequence of operations of the application for one test case—performing an item search in the mobile shopping application. The case may include steps, such as, (1) displaying the homepage; (2) receiving input in the search bar, for example, a title of a book; (3) conducting a search; and (4) returning a search result, for example, a list of items relevant to the book. Based on the learning test definition, application learner 110 may send task actions to system under test 105 through test interface 125 to command executions of the learning test of the application, but with explorations. With the explorations, application leaner 110 may command task actions to deviate from the prescribed learning test definition. This allows application learner 110 to navigate operations of the application. In return, application learner 110 may receive feedback from system under test 105. The feedback may indicate status of the application following a commanded task action, for instance, whether an action is executed successfully, whether a webpage is properly loaded, etc. Based on the explorations and feedback, application learner 110 may develop knowledge of operations of the application and store the application knowledge, for instance, in application knowledge database 130 through storage interface 120. Note that system under test 105 is basically a system for application execution. Thus, system under test 105 may be implemented by any applicable testing system, such as a simulator, an emulator, a real device (e.g., an Android or iOS smart phone), or the like.

In a regular functional test, test execution and repair manager 115 may receive a functional test definition, for instance, from test definitions repository 135 through storage interface 120. The functional test definition may prescribe a set of instructions for a functional test. Test execution and repair manager 115 may command executions of the functional test of the application, step by step following the functional test definition, on system under test 105 through test interface 125. Test execution and repair manager 115 may receive feedback from system under test 105, based on which, test execution and repair manager 115 may detect whether there is a failure of the functional test. Responsive to detecting the failure, test execution and repair manager 115 may obtain knowledge of operations of the application from application knowledge database 130 through storage interface 120. Based on the knowledge information, test execution and repair manager 115 may determine a repair, for instance, an alternative sequence of operations of the application to circumvent the failure. Test execution and repair manager 115 may then apply the repair to path the functional test. By repairing the functional test, test execution and maintenance system 100 can allow for automatic testing without an interruption requesting for QAE's manual corrections. This may accelerate testing speed and improve efficiency.

Figure 2B:
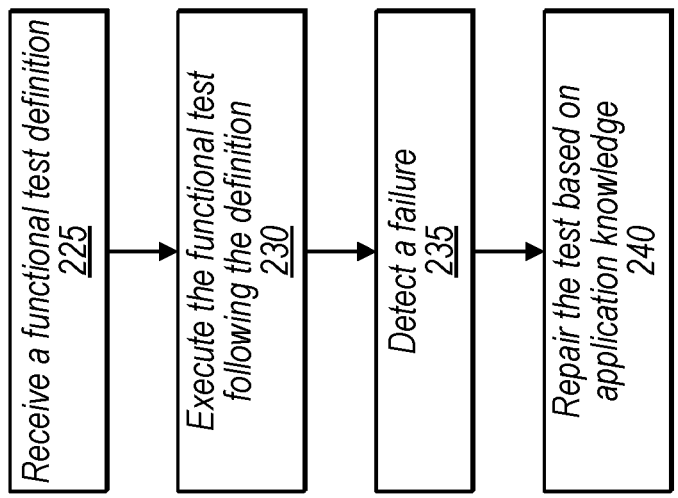
FIG. 2B is a flowchart showing a simplified operation of an example test execution and repair manager, according to some embodiments.
Figure 2A:
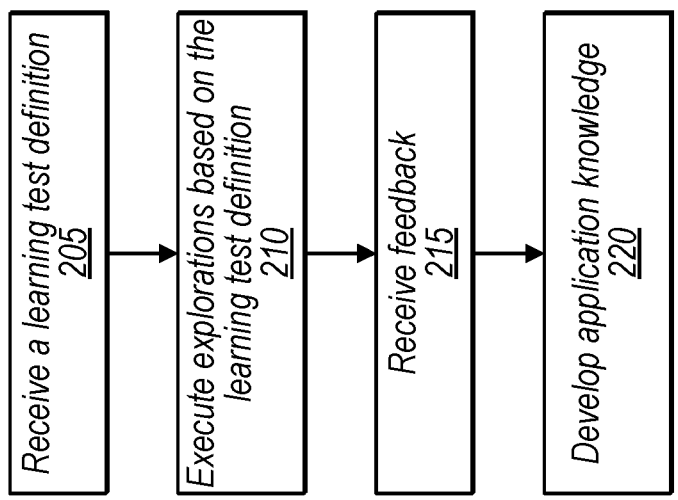
FIG. 2A is a flowchart showing a simplified operation of an example application learner, according to some embodiments.

FIGS. 2A and 2B illustrate simplified operations of application learner 110 and test execution and repair manager 115, respectively. As shown in FIG. 2A, application learner 110 may first receive a learning test definition prescribing a learning test, for instance, from test definitions repository 135 (block 205). Application learning 110 may execute explorations of the application based on the learning test definition, for instance, on system under test 105 (block 210). If the learning test definition is viewed as a prescribed sequence of operations for the application, application learner 110 may use the prescribed sequence as a baseline and deviate from the baseline to explore other possible operations of the application. Application learner 110 may receive feedback indicating status of operations of the application in the explorations, for instance, from system under test 105 (block 215). Application learner 110 may develop knowledge of operations of the application based on the explorations and feedback, and store the application knowledge in application knowledge database, for example (block 220). For instance, based on the explorations and associated feedback, application learner 110 may learn one or more sequences of operations of the application, alternative to the "baseline" sequence prescribed by the learning test definition, to complete the learning. Knowledge of the alternative sequences of operations of the application may form the knowledge of operations of the application. As shown in FIG. 2B, test execution and repair manager 115 may receive a functional test definition prescribing a regular functional test, for instance, from test definitions repository 135 (block 225). Test execution and repair manager 115 may command executions of the functionality following the functional test definition step by step, for instance, on system under test 105 (block 230). Test execution and repair manager 115 may receive feedback from system under test 105 and detect whether there is a failure of the functional test (block 235). Responsive to detecting the failure, test execution and repair manager 115 may obtain application knowledge, for instance, from application knowledge database 130 and accordingly repair the functional test (block 240).

Test execution and maintenance system 100 may implement application learner 110 based on machine learning algorithms. Various machine learning approaches may be used, for instance, reinforcement learning, deep learning neural networks, convolutional neural networks, or tabular methods. For purposes of illustration, this disclosure uses Q-learning based reinforcement learning, as one example, to describe operations of application learner 110. The operations of application learner 110 may be represented by a set of states s and actions a. A state s describes a current situation of the software, and an action a is what an agent can do in each state. Regarding the above example of the mobile shopping application, the state may correspond to one webpage of the application, and actions may represent various customer interactions via the application. Referring back to the item search example, state s(1) may represent the homepage of the application. Receiving input data in the search bar may then be denoted as action a(1). When input data in the search bar is successfully verified, the application may proceed to conduct the search and thus transition to a next state s(2). Following this example, for given test case(s) and step(s) prescribed by a test script, the states and actions may be defined accordingly. A sequence of states, connected by associated actions, may form a sequence of operations of the application (or a "path"). Thus, a functional test may be represented by a path: s(1)→a(1)→s(2)→a(2)→s(3) . . . →s(goal) where s(goal) represents the final state (or the final webpage of the application after a test). Note that the states and actions may be defined flexibly in testing. Even in this book search example, states may or may not be a visible webpage. Instead, states may signify an "intermediate" internal condition of the application along the path of a test. What is more important is to complete the test, i.e., being able to arrive at an objective state from an initial state. One goal of application learner 110 is to navigate the application to develop knowledge as to operations of the application.

When test execution and maintenance 100 detects a failure in a functional test, test execution and maintenance 100 may use the application knowledge to identify an alternative sequence of operations to repair the failure. The alternative sequence of operations may represent an alternative path (including states and actions) to circumvent the failure to arrive at the objective state s(goal). According to some embodiments, an "optimal" path, for example, with a minimum number of operations to reach the objective state, may be selected as the repair. Consider testing the application as navigating a maze. The entrance to the maze is, for example, the homepage of the application, with an exit being the functionality to be tested. The optimal path may map the shortest "distance" between the entrance and exit. With regards to a functional test, using a shortest path to patch a break of the test may reduce testing time, improve testing efficiency, save compute resources, and provide better testing experience.

In the context of reinforcement learning, system under test 105 (with test interface 125) may represent an environment to application learner 110. An environment is an external system to an reinforcement learning agent, which may be viewed as a stochastic state machine with finite input (e.g., actions sent from application learner 110) and output (e.g., observations and rewards sent to application learner 110). For purposes of illustration, the environment may be formulated based on the Markov Decision Process (MDP), for example, where future states are perceived independent from any previous state history given the current state and action. During the interactions with application learner 110, the environment may evaluate an action a(i) by application learner 110 in a current state s(i), determine an observation such as a next state s(i+1), and provide a reward r(i) for the taken action a(i). The reward may be positive or negative. A positive reward may represent a positive evaluation as to the action of application learner 110, while a negative reward may signify a "punishment." As described above, since application learner 110 aims at identifying the optimal path to repair a failure, the reward may thus be associated with the length of a path. For example, application learner 110 may be rewarded a (positive or negative) reward for each operation of the application along a path, and the entire path may be then rated with a total reward. A shorter path may render a higher total reward, while a longer path may yield a lower total reward to application learner 110. The reinforcement learning is to maximize the total reward, with which application learner 110 may be trained to recognize the optimal path. Compared to existing testing tools based on random input, the reinforcement learning may provide test execution and maintenance system 100 with a more directional, intelligent and efficient learning experience (to search for an optimal repair). This again may save computing resources and improve testing speed.

For purposes of illustration, training of application learner 110 may be performed, for example, based on a Q-learning algorithm with function approximation. The goal of Q-learning is to learn an optimal action-selection path, which maximizes an expected value of the total reward for application learner 110 over any and all successive steps, starting from the current state. Q-learning aims at maximizing not the immediate reward received by an action at a current state but the total (including immediate and future) reward until reaching the final objective state. To do this, Q-learning algorithm may define a value function Q(s, a) to predict the total reward expected to be received by application learner 110, given that at state s, the agent takes action a. The value function Q(s, a) may be defined by adding the maximum reward attainable from future states to the reward for achieving its current state, effectively influencing the current action by the potential future reward. Thus, Q(s, a) is an indication for how good it is for an agent to pick an action a while being in state s. For application learner 110 to identify an optimal path, this is essentially equivalent to search for the maximum (or optimal) value function Q*(s, a). The optimal value function Q*(s, a) means that application learner 110, starting in state s, picks action a and then behaves optimally afterwards. In training, the value function Q(s, a) may start from an initialized value, for example, an arbitrary fixed value. Then, at each training step k, application learner 110 may select action a(k) in state s(k), and estimate future reward r(k), for example, according to equation (1).

$$G = r_k + \gamma \max(Q_k(s_{k+1}, a_k)) \quad (1)$$

where G represents an estimate of the Q value (i.e., the expected total reward) with action a(k) in state s(k), $r_k$ represents the immediate reward received from environment, $\max(Q_k(s_{k+1}, a_k))$ represents an estimate of the optimal future return if the agent takes action a(k) at state s(k), and γ is a discount factor. application learner 110 may take a set of different actions a(k) at each state s(k). Each pair of state and action may represent one operating circumstance of the software, and a sequence of circumstances may form a path. For each chosen path, the Q-learning algorithm may predict an estimated total reward, for example, according to equation (1). Some paths may cause higher total rewards, some may render lower total rewards, and some may result in a failure. Based on the estimated total rewards, application learner 110 may learn, among the different actions a(k), which one may render an optimal action, at state s(k), to arrive at the goal state s(goal).

The Q-learning algorithm may further be combined with function approximation to achieve even improved performance. The function approximation may represent the value function Q(s, a) by a set of predetermined functions q(s, a). For example, the value function Q(s, a) may be approximated by a linear combination of functions q(s, a) according to equation (2):

$$Q(s, a, \theta) = \sum_{i=1}^{M} q_i(s, a) \theta_i \quad (2)$$

where $q_i(s, a)$ is the i-th approximation function and $\theta_i$ is the corresponding i-th parameter θ (or weight). Thus, the problem of searching for the optimal Q*(s, a) may now become a problem of identifying (or training) the parameters θ. One approach to tune the parameters θ may be based on the gradient descent of the value function Q(s, a), for example, according to equation (3):

$$\theta_{(i)k+1} = \theta_{(i)k} + \alpha [G - Q_k(s_k, a_k, \theta)] \frac{\partial Q_k(s_k, a_k, \theta)}{\partial \theta_{(i)}} \quad (3)$$

where $\theta_i$ represents the i-th parameter of θ, G and $Q_k(s_k, a_k, \theta)$ represent the respective new and old estimates of the total reward, ∂ represents a differentiation operation, and α is a learning rate.

Figure 3:
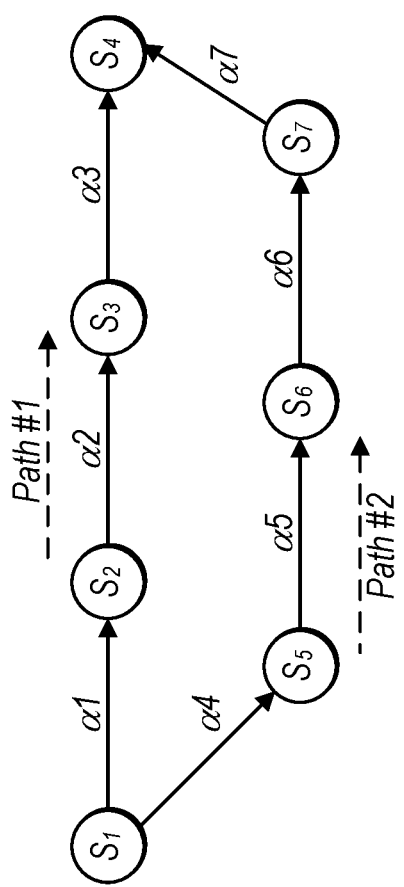
FIG. 3 is a block diagram showing example sequences of operations of an application, according to some embodiments.
Figure 4:
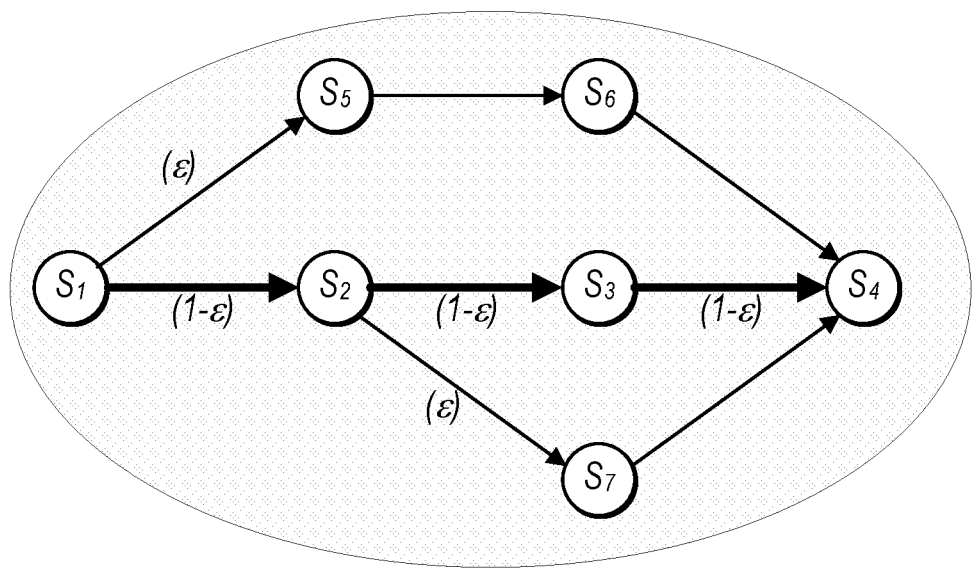
FIG. 4 is a block diagram showing example explorations of an application by an application learner, according to some embodiments.

The training process of application learner 110 may begin with one or more prior functional test(s). For example, a first training may include a first sequence of circumstances: s(1)→a(1)→s(2)→a(2)→s(3)→a(3)→s(4), while a second case may comprise a second sequence of circumstances: s(1)→a(4)→s(5)→a(5)→s(6)→a(6)→s(7)→a(7)→s(4), as shown in FIG. 3, according to some embodiments. In FIG. 3, each node represents one individual state of the application, for example, one webpage of the mobile shopping application; each arrow corresponds to one action by application learner 110 (corresponding to one task action); and each path represents one sequence of operations of the application to complete the test. Besides the prescribed path, application learner 110 may navigate a neighborhood around the given path to develop knowledge of operations of the application. For example, at each state, application learner 110 may deviate from a prescribed path, for example, by taking an action different from the prescribed action, to explore an adjacent region of the given path—the shaded area as shown in FIG. 4. The chance for application learner 110 to deviate from a path may be determined, for instance, by a probability 8. With probability 8, application learner 110 may take a deviation to explore. Alternatively, with probability (1-s), application learner 110 may follow the prescribed test definition without exploration. Explorations may help application learner 110 to develop knowledge about operations of the application, which may be then used to repair a failure in a regular functional test. Note that FIGS. 3 and 4 depict only simple examples for purposes of illustration. The real scenarios may be more complicated. For instance, the sequences of operations of the application (or paths) may become longer involving more operations of the application; there may be more different ways to deviate from the prescribed sequence of operations; and the deviation may create more alternative sequences of operations of the application.

Figure 5:
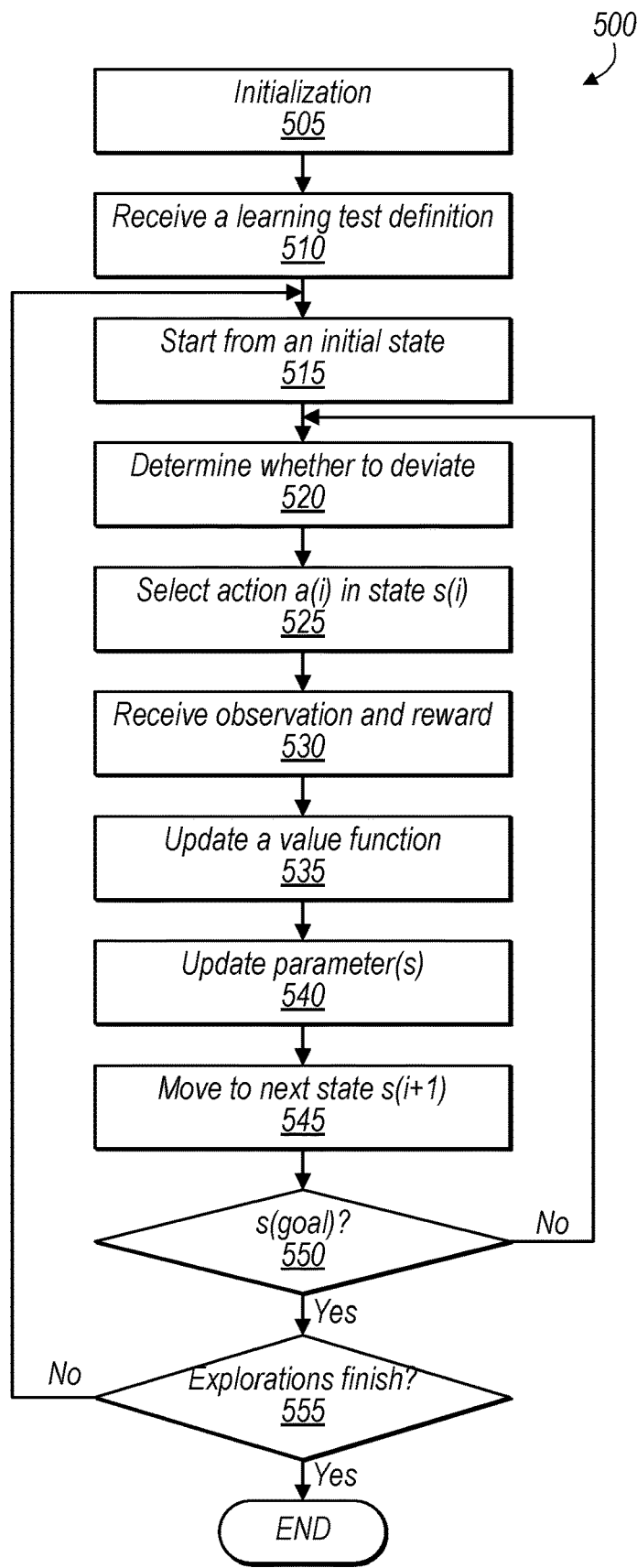
FIG. 5 is a flowchart showing an example training process of an application learner, according to some embodiments.

FIG. 5 shows an example training process of application learner 110, according to some embodiments. As shown in FIG. 5, training process 500 may begin with initialization (block 505). Initialization may provide initial values for training parameters, such as the Q value, discount factor γ, learning rate α, parameters θi (i=1 . . . M) and deviation probability ε. Next, application learner 110 may receive a learning test definition prescribing a sequence of operations of the application (block 510). Application learner 110 may command operations of the application from an initial state (block 515). Taking the above mobile shopping application as an example, the initial state may represent the homepage of the application. Next, application learner 110 may execute explorations to develop knowledge of operations of the application. For instance, application learner 110 may take the sequence of operations prescribed by the learning test definition as a "baseline" and determine whether to deviate from the given sequence, for instance, based on a probability ε (block 520). Following the decision, application learner 110 may choose an action a(i) at a state s(i) and send the corresponding task action, for instance, to system under testing 105 of FIG. 1 (block 525). Application learner 110 may then receive output, such as the observation and reward as described above (block 530). Application learner 110 may update an estimate of the Q function, for example, based on equation (1) as described above (block 535). Next, application learner 110 may update the parameters θi (i=1 . . . M) of the function approximation of the value function Q(s, a, θ), for example, based on equation (3) (block 540). Then, application learner 110 may move to a next state s(i+1) (block 545). Training process 500 may determine whether arriving at the objective state s(goal) (i.e., completing the learning test) and, as needed, repeat the above operations (block 550). When application learner 110 deviates from the prescribed sequence of operations to reach the objective state s(goal), application learner 110 essentially identifies an alternative sequence, different from the prescribed sequence, of operations of the application to finish the prescribed test. Application learner 110 may store acquired knowledge about the alternative sequence of operations, for instance, into application knowledge database 130 of FIG. 1. Application learner 110 may then return to the initial state to repeat the above operations until explorations finish (block 555). Application learner 110 may determine to finish the explorations based on one or more criteria, for instance, a duration for which application learner 110 has been executing explorations, whether or not application learner 110 learns alternative sequences of operations, and how many alternative sequences are identified. Repeating the explorations gives application learner 110 a chance to learn additional alternative sequence(s) of operations because deviation may be controlled based on the probability ε such that application learner 110 does not simply repeat the same sequence of deviational operations. When explorations complete, all the identified alternative sequences of operations may become part of the knowledge of operations of the application. According to some embodiments, application learner 110 may further execute explorations based on different learning test definitions, instead of repeatedly using the same prescribed sequence of operations as the "baseline." This may permit application learner 110 to navigate an even larger region of operations and develop a more comprehensive knowledge of the application.

Figure 6:
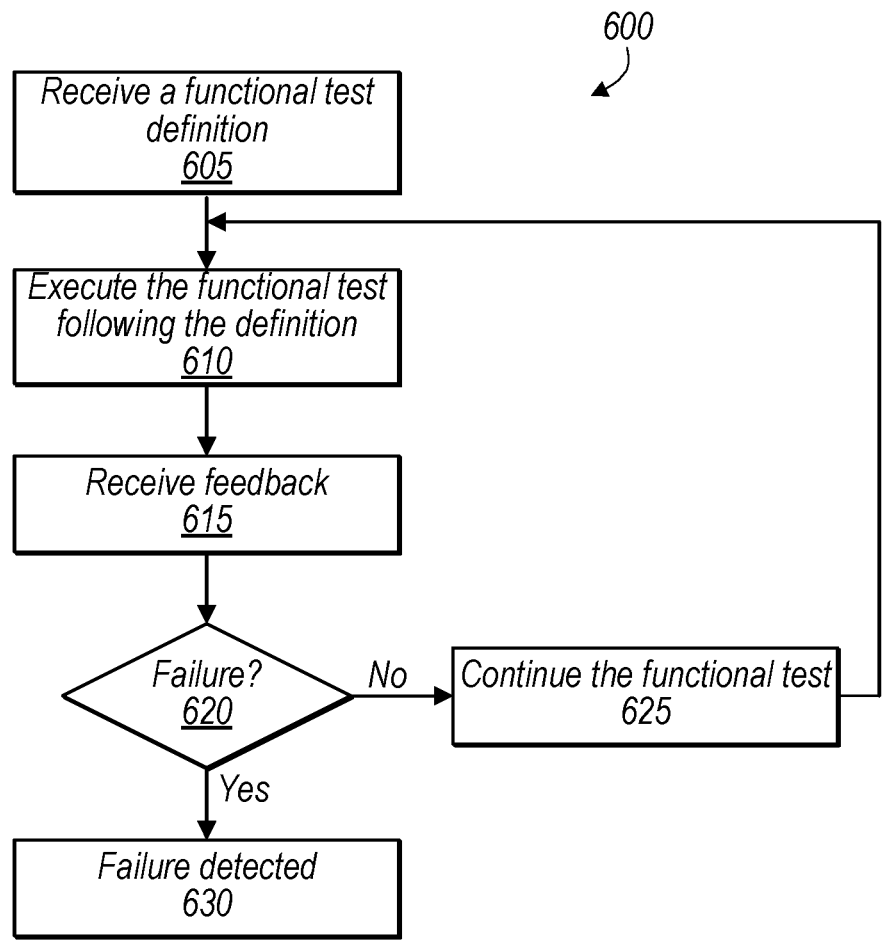
FIG. 6 is a flowchart showing an example operation of a test execution and repair manager, according to some embodiments.

Once trained, test execution and maintenance system 100 may be deployed to execute and maintain an application functional test based on acquired knowledge of operations of the application. FIG. 6 shows an operation 600 of test execution and repair manager 115 in deployment, according to some embodiments. As shown in FIG. 6, test execution and repair manager 115 may receive a functional test definition, for instance, from test definitions repository 135 (block 605). The test script may prescribe a sequence of operations of the application for the functional test. Test execution and repair manager 115 may follow the given functional test definition, step-by-step (block 610). For instance at each prescribed state s(i), test execution and repair manager 115 may take an prescribed action a(i) and send the corresponding task action to system under test 105. In return, test execution and repair manager 115 may receive feedback (block 615). Based on the feedback, test execution and repair manager 115 may detect whether there is a failure in the functional test (block 620). According to some embodiments, test execution and repair manager 115 may detect a failure if the task action does not exit any more. For example, if test execution and repair manager 115 commands system under test 105 to display a list of found items but system under test 105 returns an error that the task action cannot be executed, test execution and repair manager 115 may determine a failure occurs. Alternatively, test execution and repair manager 115 may also detect a failure if system under test 105 "executes" the test action but lands on a state (or condition) different from the state prescribed by the functional test definition. Following the same example above, if system under test 105 erroneously switches to a webpage displaying the shopping cart instead of the found items, test execution and repair manager 115 may also determine that a failure occurs in the functional test. When test execution and repair manager 115 does not detect a failure, test execution and repair manager 115 may continue the test following the given functional test definition (block 625). Conversely, when a failure happens, test execution and repair manager 115 may determine that a failure is detected (block 630).

Figure 7:
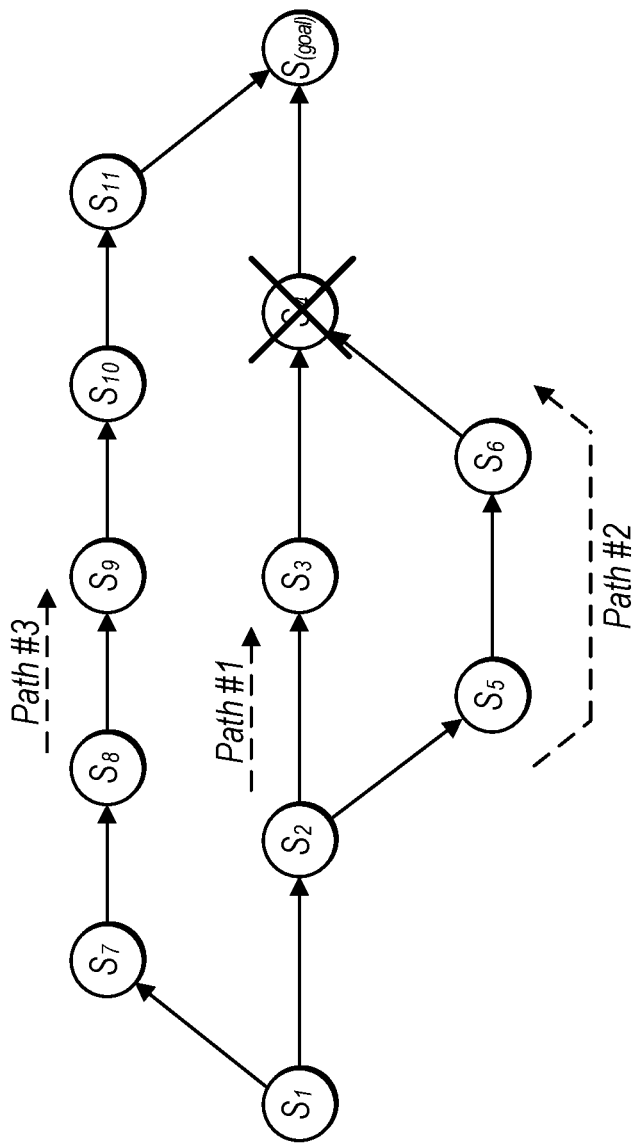
FIG. 7 is a block diagram showing example constraints associated with a functional test failure, according to some embodiments.

When a failure occurs, the environment may vary as well. As explained above, the environment may be viewed as a state machine with finite states and actions. Thus, when the test breaks, one or more states and/or actions may not exit any more. That means, one or more previously learnt paths may have been lost in the environment. FIG. 7 shows an example scenario of a functional test failure, according to some embodiment. FIG. 7 depicts three different paths from state s(1) to state s(goal). Path #1 may present the sequence of operating circumstances of the application based on a functional test. Initially, path #2 may be the optimal alternative path for path #1 because it includes a minimum number of circumstances (e.g., six circumstances) among all the alternative paths as to complete the functional test. Path #3 is less optimal than path #2, because path #3 includes more (e.g. seven) circumstances. However, if the failure is associated with state s(4), as shown in FIG. 7, not only can the test not be completed following the prescribed path #1, path #2 is not a viable path any more either. As a result, test execution and maintenance system 100 may now select path #3, rather than #2, to repair the failure of the functional test.

Figure 8:
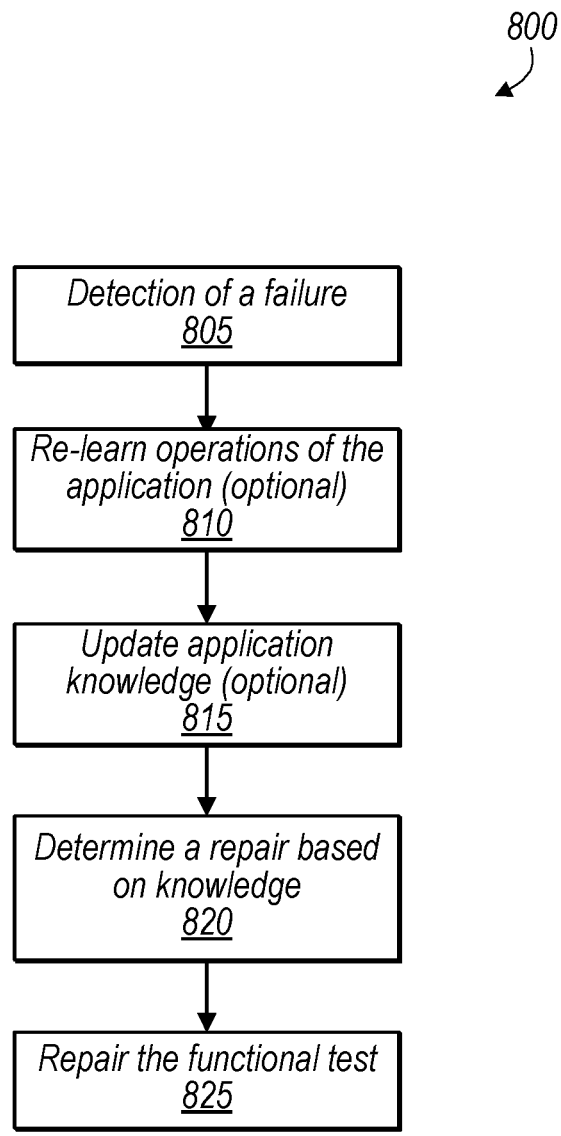
FIG. 8 is a flowchart showing an example operation to repair a broken functional test by an application learner, according to some embodiments.

To accommodate the environmental variation due to failures, when a failure is detected, application learner 110 may optionally re-learn the "change" application to update knowledge of operations of the application (with the detected failure). The re-learning process may be performed same as an initial learning as described above with regards to FIG. 5. Alternatively, according to some embodiments, application learner 110 may use transfer learning to transfer cognitions from previous learnings to the re-learning process. For instance, instead of initializing parameters for instance, θi (i=1 . . . M), to random values, application learner 110 may perform training with previous values. The previous values of the parameters carry application knowledge from previous learning and thus avoid the re-learning from a complete scratch, which can accelerate the re-learning process. FIG. 8 shows an example operation to repair a broken functional test by test execution and repair manager 115, according to some embodiments. As shown in FIG. 8, repair process 800 may begin with detection of a failure in a functional test by test execution and repair manager 115 (block 805). Responsive to detecting the failure, application learner 110 may optionally perform a re-learning process and update the application knowledge based on re-learning, for instance, stored in application knowledge database 130 (block 810). As described above, the failure may cause one or more constraints as to operations of the application. Thus, application learner 110 may utilize the re-learning to update previously acquired application knowledge (block 815). The re-learning may be performed same as the steps described above with regards to FIG. 5. Alternatively, application learner 110 may use transfer learning to implement re-learning with previous acquired parameter values. Once the re-learning finishes, test execution and repair manager 115 may determine a repair for the failure based on the (updated) knowledge of operations of the application (block 820). As described above, test execution and repair manager 115 may obtain the (updated) knowledge of applications of the application, for instance, from application knowledge database 130. Test execution and repair manager 115 may repair the functional test, for instance, by identifying an alternative sequence of operations with a minimum number of operations (block 825).

Figure 9:
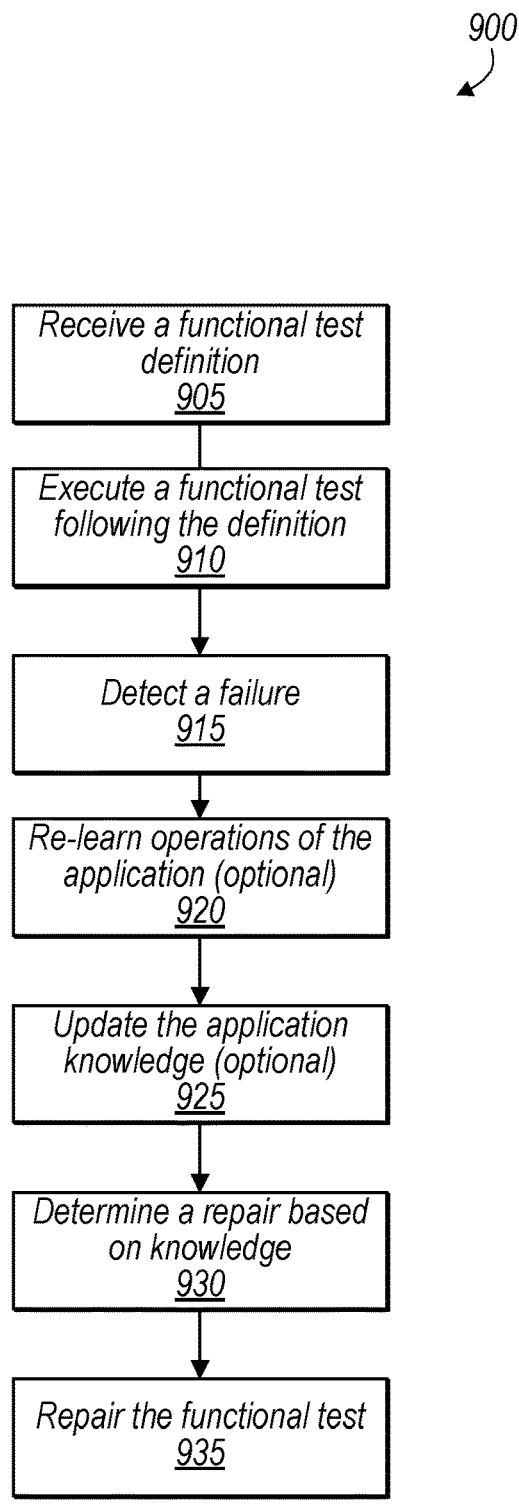
FIG. 9 is a flowchart showing an example operation of a test execution and maintenance system, according to some embodiments.

FIG. 9 shows example operation 900 of test execution and maintenance system 100, according to some embodiments. In FIG. 9, test execution and maintenance system 100 may be used to run and maintain a functional test of an application. As shown in FIG. 9, test execution and maintenance system 100 may first receive a functional test definition which prescribe a sequence of operations of an application (block 905). Test execution and maintenance system 100 may execute the functional test, following the given functional test definition (block 910). For instance, test execution and maintenance system 100 may take a prescribed action a in a given state s, and send corresponding task action to system under test 105 through test interface 125. Test execution and maintenance system 100 may detect a failure in the functional test, for instance, based on feedback from system under test 105 (block 915). Optionally, test execution and maintenance system 100 may demand application learner 105 to re-learn operations of the application associated with one or more constraints caused by the failure (block 920). Test execution and maintenance system 100 may update the application knowledge based on the re-learning (block 925). Test execution and maintenance system 100 may determine a repair (block 930 and repair the broken functional test based on the (updated) knowledge of operations of the application (block 935).

Figure 10:
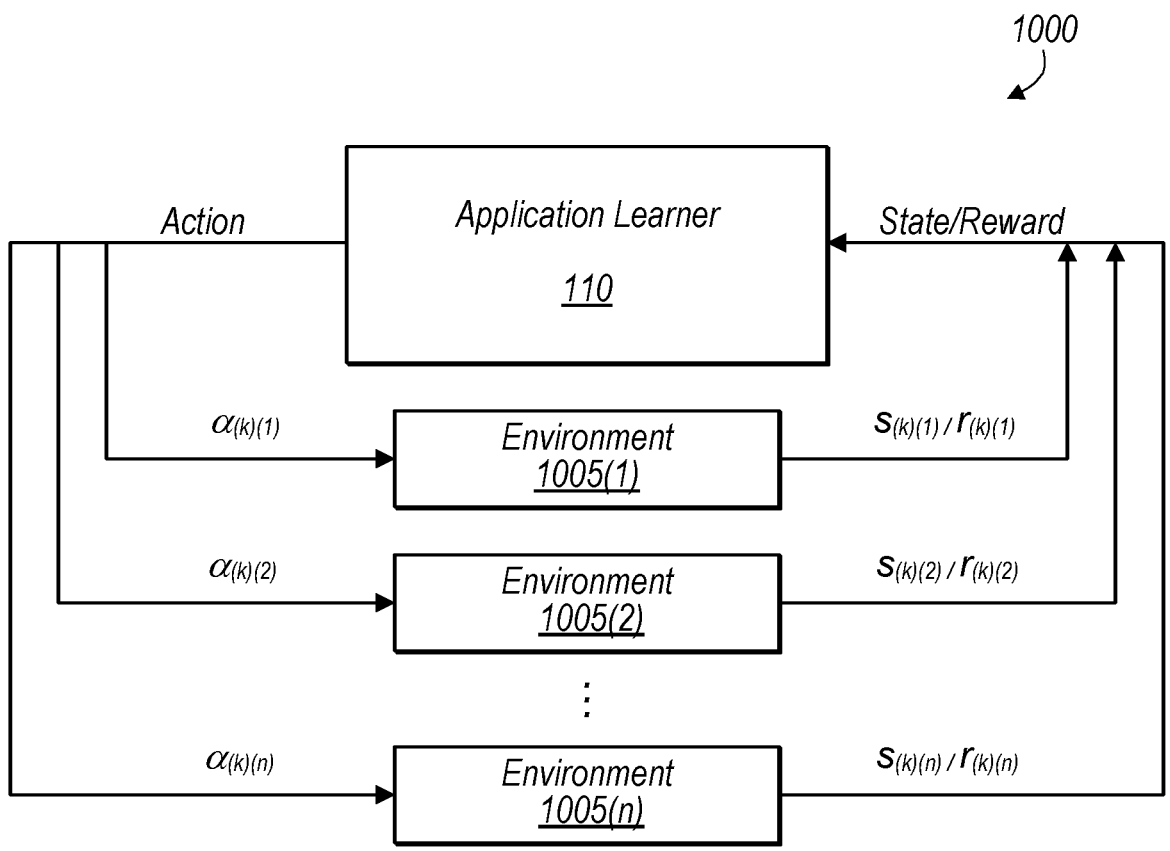
FIG. 10 is a block diagram showing an example asynchronous training process of an application learner, according to some embodiments.

According to some embodiments, test execution and maintenance system 100 may include a set of application learners 110 to execute and maintain applications for different test systems. For example, test execution and maintenance system 100 may use a first application learner 110 to develop knowledge of operations of an application on a first system under test 105 representing an Android device. This knowledge may be stored in application knowledge database 130. Additionally, test execution and maintenance system 100 may use a second application learner 110 to develop knowledge of operations of the application on a second system under test 105 representing an iOS device. This knowledge may also be stored in the same application knowledge database 130, or alternatively, in a different application knowledge database 130. Alternatively, test execution and maintenance system 100 may use a same, central application learner 110 to execute and maintain applications for different test systems. FIG. 10 shows an example asynchronous training process 1000 of application learner 110. As shown in FIG. 10, a plurality of systems under test may be represented by a set of environments 1005(1)-(n). For instance, environment 1005(1) may correspond to a system under test for a Samsung Galaxy S10, environment 1005(2) may correspond to a Pixel 4, environment 1005(3) may represent iPhone 11, etc. Application learner 110 may train to develop knowledge of operations of an application on the different testing systems, with one single set of parameters, for instance, θi (i=1 . . . M). According to some embodiments, in training, application learner 110 may update the parameters based on interactions with environments 1005(1)-(n), asynchronously. For instance, in a given state s(k), application learner 110 may take an action a(k)(1) for environment 1005(1) to explore operations of the application on environment 1005(1) and update the parameters θi based on feedback from 1005(1), following the process as described above with regards to FIG. 5. Next, application learner 110 may take an action a(k)(2) for environment 1005(2) to explore operations of the application on environment 1005(2) and update the parameters θi based on feedback from environment 1005(2), and so on. With the asynchronous training, application learner 110 may train the parameters sequentially based on interactions with environments 1005(1)-(n), without waiting for all the feedback to become available and then updating the parameters.

Figure 11:
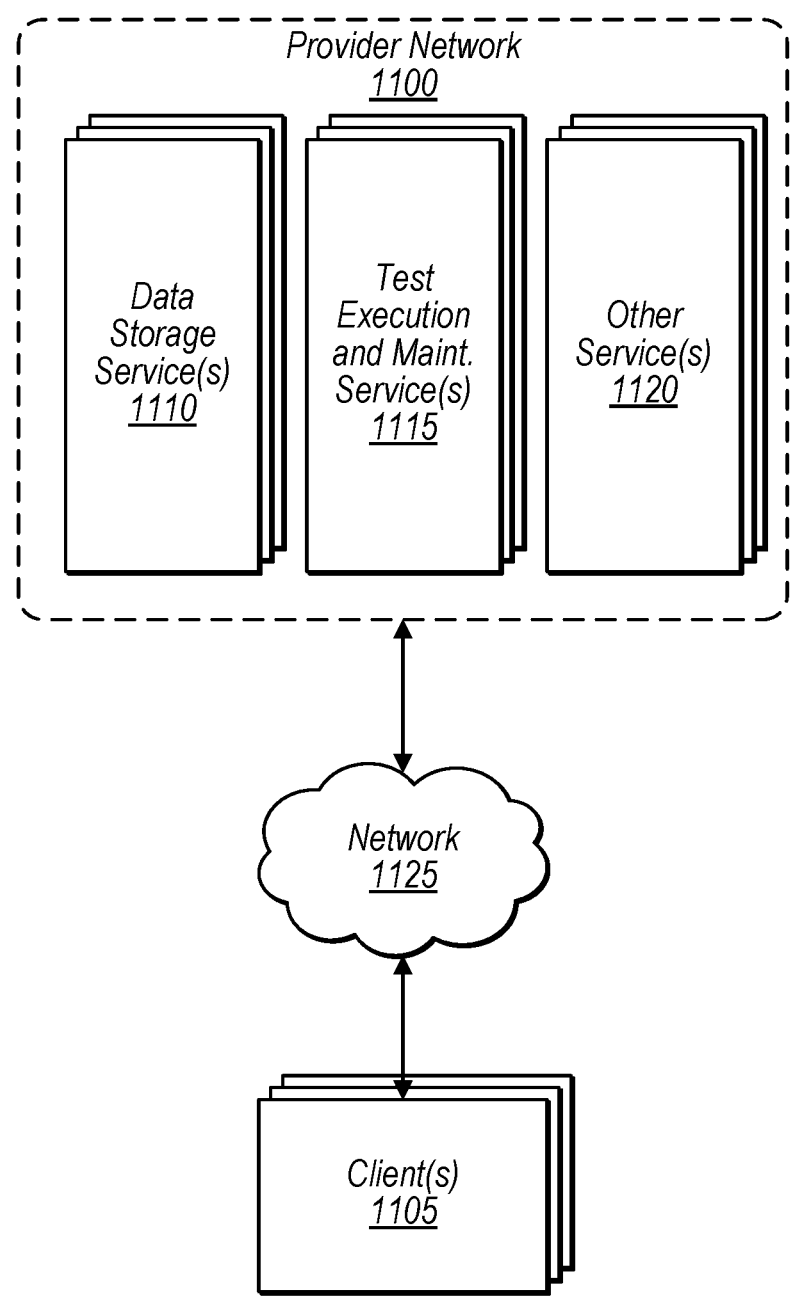
FIG. 11 is a block diagram showing providing application test execution and maintenance as a provider network service, according to some embodiments.

FIG. 11 is a block diagram showing providing application test execution and maintenance as a provider network service, according to some embodiments. In FIG. 11, provider network 1100 may be a private or closed system or may be set up by an entity such as a company or a public sector organization to provide one or more services (such as various types of cloud-based storage) accessible via the Internet and/or other networks 1270 to one or more client(s) 1105. Provider network 1100 may be implemented in a single location or may include numerous data centers hosting various resource pools, such as collections of physical and/or virtualized computer servers, storage devices, networking equipment and the like (e.g., computing system 1200 described below with regard to FIG. 12), needed to implement and distribute the infrastructure and storage services offered by provider network 1100. In some embodiments, provider network 1100 may implement various computing resources or services, such as a data storage service(s) 1110 (e.g., object storage services, block-based storage services, or data warehouse storage services), application test execution and maintenance service(s) 1115, as well as other service(s) 1120, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Data storage service(s) 1110 may implement different types of data stores for storing, accessing, and managing data on behalf of client(s) 1105 as a network-based service that enables one or more client(s) 1105 to operate a data storage system in a cloud or network computing environment. For example, data storage service(s) 1110 may include various types of database storage services (both relational and non-relational) or data warehouses for storing, querying, and updating data. Such services may be enterprise-class database systems that are scalable and extensible. Queries may be directed to a database or data warehouse in data storage service(s) 1110 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 1110 may also include various kinds of object or file data stores for putting, updating, and getting data objects or files, which may include data files of unknown file type. Such data storage service(s) 1110 may be accessed via programmatic interfaces (e.g., APIs) or graphical user interfaces. Data storage service(s) 1110 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, application test execution and maintenance service(s) 1115 may be provided by provider network 1100 as a network-based service to test and maintain clients' applications. For instance, provider network 1100 may include an application test and maintenance repository, in data storage service(s) 1110 or other service(s) 1120. The application test and maintenance repository may contain application test and maintenance models, each representing one test execution and maintenance system 100 (including application learner 110 and test execution and repair manager 115) as described above, for various applications, tests and testing systems. Client(s) 1105 may send a request to provider network 1100 for test execution and maintenance service(s) 1115 through network 1125 to test and maintain an application uploaded by client(s) 1105. The request may further provide learning test definitions and specify a functional test definition for a specified system under test. Upon receiving the request, test execution and maintenance service(s) 1115 may identify an appropriate test execution and maintenance model in the repository (for the specified system under test, for example), load the identified model as an instance, and explore operations of the client's application based on the client's learning test definitions, for instance, with the application learner. By exploration, the test execution and maintenance model may develop knowledge of operations of the client's application on the specified system under test. Next, test execution and maintenance service(s) 1115 may execute the functional test of the client's application, detect failures and repair the functional test based on the application knowledge, for instance, with the test execution and repair manager.

Other service(s) 1120 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 1110. Various other distributed processing architectures and techniques may be implemented by data processing services (e.g., grid computing, sharding, distributed hashing, etc.). Note that in some embodiments, data processing operations may be implemented as part of data storage service(s) 1110 (e.g., query engines processing requests for specified data).

Generally speaking, client(s) 1105 may encompass any type of client configurable to submit network-based requests to provider network 1100 via network 1125, including requests for storage services (e.g., a request to create, read, write, obtain, or modify data in data storage service(s) 1110, a request to perform application test execution and maintenance at test execution and maintenance service 1115, etc.). For example, a given client 1105 may include a suitable version of a web browser, or may include a plug-in module or other type of code module configured to execute as an extension to or within an execution environment provided by a web browser. Alternatively, a client 1105 may encompass an application such as a database application (or user interface thereof), a media application, an office application or any other application that may make use of storage resources in data storage service(s) 1110 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 1105 may be an application configured to interact directly with provider network 1100. In some embodiments, client(s) 1105 may be configured to generate network-based services requests according to a Representational State Transfer (REST)-style network-based services architecture, a document- or message-based network-based services architecture, or another suitable network-based services architecture.

Figure 12:
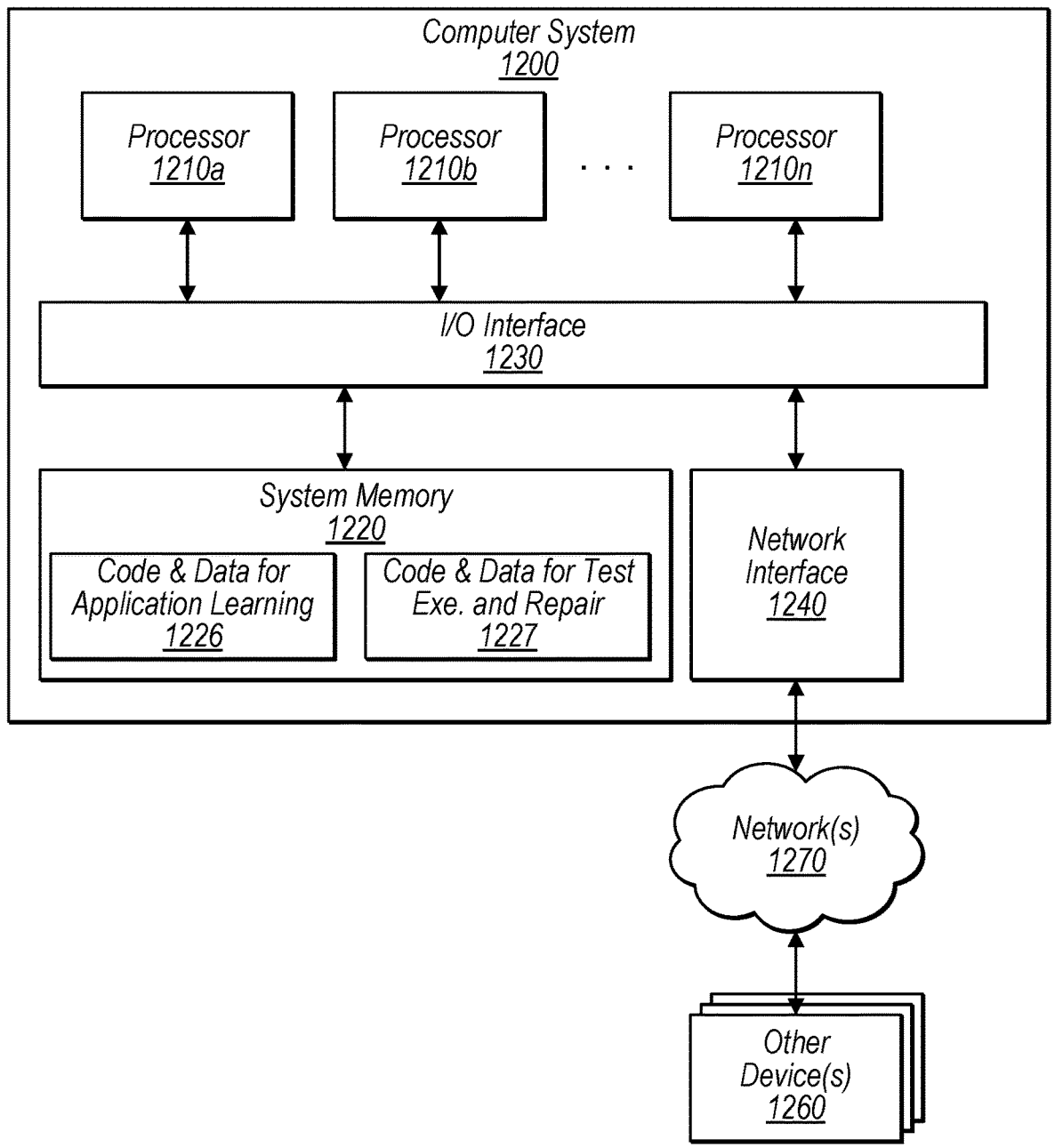
FIG. 12 is a block diagram showing an example computing system configured to implement the various methods, techniques and systems described herein, according to some embodiments.

In various embodiments, network 1125 may encompass any suitable combination of networking hardware and protocols necessary to establish network-based-based communications between client(s) 1105 and provider network 1100. For example, network 1125 may generally encompass the various telecommunications networks and service providers that collectively implement the Internet. Network 1125 may also include private networks such as local area networks (LANs) or wide area networks (WANs) as well as public or private wireless networks. For example, both a given client 1105 and provider network 1100 may be respectively provisioned within enterprises having their own internal networks. In such an embodiment, network 1125 may include the hardware (e.g., modems, routers, switches, load balancers, proxy servers, etc.) and software (e.g., protocol stacks, accounting software, firewall/security software, etc.) necessary to establish a networking link between given client 1105 and the Internet as well as between the Internet and provider network 1100. It is noted that in some embodiments, client(s) 1105 may communicate with provider network 1100 using a private network rather than the public Internet Test execution and maintenance system 100, including application learner 110 and test execution and repair manager 115, described herein may in various embodiments be implemented by any combination of hardware and software. For example, in one embodiment, test execution and maintenance system 100 may be implemented by a computer system (e.g., a computer system as in FIG. 12) that includes one or more processors executing program instructions stored on a computer-readable storage medium coupled to the processors. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor(s) 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions (e.g., code) and data implementing one or more desired functions, such as application learning and test execution and repair, are shown stored within system memory 1220 as code & data 1226 and code & data 1227.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as system under test 105, application knowledge database 130, test definitions repository 135, and/or other computer systems or devices as illustrated in FIGS. 1 through 11, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fiber Channel SANs, or via any other suitable type of network and/or protocol.

In some embodiments, system memory 1220 may be one embodiment of a computer-accessible medium configured to store program instructions and data as described above for FIG. 1-11. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
an application learner implemented by one or more processors and memory and configured to develop knowledge of operations of an application based on a learning test definition, wherein the learning test definition prescribes a sequence of operations of the application resulting in a goal state for completing a learning test, wherein to develop the knowledge of the operations of the application, the application learner is configured to be trained using a reinforcement learning algorithm to identify one or more alternative sequences of operations by deviating from the sequence of operations prescribed by the learning test definition to complete the learning test, the reinforcement learning algorithm comprising an iterative process including:
at a state of an operation, determining a next operation for deviating from the prescribed sequence according to a probability;
generating an estimated reward based on an output produced by the application; and
repeating the iterative process for a next state of the next operation until the goal state specified by the learning test definition is reached; and
a test execution and repair manager implemented by one or more processors and memory and configured to:
execute a functional test of the application following a functional test definition, the functional test definition prescribing a sequence of operations of the application under the functional test;
detect a failure of the functional test; and
responsive to detecting the failure of the functional test, identify, using the knowledge of operations of the application developed by the application learner, a sequence of operations that is alternative to the sequence of operations prescribed by the functional test definition to repair the functional test, wherein identification of the alternative sequence of operations comprises identifying multiple sequences of operations alternative to the prescribed sequence of operations to repair the function test and comparing numbers of operations between the multiple sequences of operations to identify one with a fewest number of operations as the alternative sequence.

2. The system of claim 1, wherein to detect a failure of the functional test, the test execution and repair manager is configured to:
detect one of that (1) a task action fails to be executed by a system under test or (2) after a task action is successfully executed by the system under test, the application transitions to an operating state different from one prescribed by the functional test definition.

3. The system of claim 1, wherein to repair the functional test, the test execution and repair manager is configured to identify an alternative sequence of operations of the application.

4. The system of claim 1, wherein responsive to detecting the failure of the functional test, the application learner is configured to:
update the knowledge of operations of the application with a re-learning process based on a constraint associated with the failure.

5. A method, comprising:

performing, by one or more computers:

receiving a learning test definition by an application learner which is implemented by one or more processors and memory, the learning test definition prescribing a sequence of operations of the application resulting in a goal state for completing a learning test;

training the application learner based on a reinforcement learning algorithm to acquire knowledge of operations of the application, the reinforcement learning algorithm comprising an iterative process including:

at a state of an operation, determining a next operation for deviating from the prescribed sequence according to a probability:

generating an estimated reward based on an output produced by the application; and repeating the iterative process for a next state of the next operation until the goal state specified by the learning test definition is reached; and receiving a functional test definition by a test execution and repair manager which is implemented by one or more processors and memory, the functional test definition prescribing a sequence of operations of an application under a functional test;

executing the functional test of the application, by the test execution and repair manager, following the sequence of operations of the application prescribed by the functional test definition;

detecting a failure of the functional test, by the test execution and repair manager; and responsive to detecting the failure of the functional test, identifying, by the test execution and repair manager, a sequence of operations that is alternative to the sequence of operations prescribed by the functional test definition to repair the functional test, based on the knowledge of operations of the application acquired by the application learner, wherein identification of the alternative sequence of operations comprises identifying multiple sequences of operations alternative to the prescribed sequence of operations to repair the function test and comparing numbers of operations between the multiple sequences of operations to identify one with a fewest number of operations as the alternative sequence.

6. The method of claim 5, wherein detecting a failure of the functional test comprises:

detecting, by the test execution and repair manager, one of that (1) a task action fails to be executed by a system under test or (2) after a task action is successfully executed by the system under test, the application transitions to an operating state different from one prescribed by the functional test definition.

7. The method of claim 5, wherein repairing the functional test comprises:

identifying an alternative sequence of operations of the application to circumvent the failure to complete the functional test.

8. The method of claim 5, wherein the knowledge of operations of the application comprises knowledge of the learned one or more alternative sequences of operations of the application.

9. The method of claim 8, wherein responsive to detecting the failure of the functional test, further comprising:

updating the knowledge of operations of the application, by the application learner, with a re-learning process based on a constraint associated with the failure.

10. The method of claim 9, wherein the re-learning process comprises updating a parameter associated with the application learner based on transferring a prior value of the parameter.

11. One or more non-transitory computer readable media comprising instructions which, when executed on or across one or more processors, cause the one or more processors to:

receive a learning test definition by an application learner which is implemented by one or more processors and memory, the learning test definition prescribing a sequence of operations of the application resulting in a goal state for completing a learning test;

train the application learner based on a reinforcement learning algorithm to develop knowledge of operations of the application, the reinforcement learning algorithm comprising an iterative process including:

at a state of an operation, determining a next operation for deviating from the prescribed sequence according to a probability;

generating an estimated reward based on an output produced by the application; and repeating the iterative process for a next state of the next operation until the goal state specified by the learning test definition is reached; and receive a functional test definition which prescribes a sequence of operations of an application under a functional test;

execute the functional test of the application following the sequence of operations of the application prescribed by the functional test definition;

detect a failure of the functional test; and responsive to detecting the failure of the functional test, identify a sequence of operations that is alternative to the sequence of operations prescribed by the functional test definition to repair the functional test, based on the knowledge of operations of the application developed by the application learner, wherein identification of the alternative sequence of operations comprises identifying multiple sequences of operations alternative to the prescribed sequence of operations to repair the function test and comparing numbers of operations between the multiple sequences of operations to identify one with a fewest number of operations as the alternative sequence.

12. The one or more non-transitory computer readable media of claim 11, wherein to detect a failure of the functional test, the one or more non-transitory computer readable media comprises instructions which, when executed on or across the one or more processors, cause the one or more processors to:

detect, by the test execution and repair manager, one of that (1) a task action fails to be executed by a system under test or (2) after a task action is successfully executed by the system under test, the application transitions to an operating state different from one prescribed by the functional test definition.

13. The one or more non-transitory computer readable media of claim 11, wherein to repair the functional test, the one or more non-transitory computer readable media comprises instructions which, when executed on or across the one or more processors, cause the one or more processors to:

identify an alternative sequence of operations of the application to circumvent the failure to complete the functional test.

14. The one or more non-transitory computer readable media of claim 11, wherein the knowledge of operations of the application comprises knowledge of the learned one or more alternative sequences of operations of the application.

15. The one or more non-transitory computer readable media of claim 11, wherein responsive to detecting the failure of the functional test, the one or more computer readable media further comprises instructions which, when executed on or across the one or more processors, cause the one or more processors to:

update the knowledge of operations of the application, by the application learner, with a re-learning process based on a constraint associated with the failure.

* * * * *